United States Patent
Frankland et al.

(10) Patent No.: US 10,461,573 B2
(45) Date of Patent: Oct. 29, 2019

(54) EMERGENCY POWER SUPPLY UNIT AND METHOD FOR OPERATING AN EMERGENCY LIGHTING MEANS

(71) Applicant: TRIDONIC GMBH & CO KG, Dornbirn (AT)

(72) Inventors: James Frankland, Barton (GB); Ian Wilson, Sunderland (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 159 days.

(21) Appl. No.: 15/551,327

(22) PCT Filed: Feb. 24, 2016

(86) PCT No.: PCT/AT2016/050040
§ 371 (c)(1),
(2) Date: Aug. 16, 2017

(87) PCT Pub. No.: WO2016/134396
PCT Pub. Date: Sep. 1, 2016

(65) Prior Publication Data
US 2018/0034313 A1    Feb. 1, 2018

(30) Foreign Application Priority Data

Feb. 25, 2015 (GB) .................................. 1503685.8
Jan. 18, 2016 (GB) .................................. 1600961.5

(51) Int. Cl.
*H02J 9/06* (2006.01)
*H05B 33/08* (2006.01)
(Continued)

(52) U.S. Cl.
CPC ............ *H02J 9/061* (2013.01); *H02J 7/0031* (2013.01); *H02J 7/0068* (2013.01); *H02J 9/005* (2013.01);
(Continued)

(58) Field of Classification Search
CPC .... H02J 9/005; H02J 9/02; H02J 9/061; H02J 9/065; H02J 7/0031; H02J 7/0068;
(Continued)

(56) References Cited

U.S. PATENT DOCUMENTS

| 4,150,302 A | 4/1979 | Roche |
| 6,502,044 B1 | 12/2002 | Lane et al. |
| 2015/0155743 A1 | 6/2015 | Noguchi |

FOREIGN PATENT DOCUMENTS

| CN | 202872419 | 4/2013 |
| EP | 2249459 | 11/2010 |

(Continued)

OTHER PUBLICATIONS

UK Search Report in priority application GB1600961.5 dated Aug. 11, 2016.
(Continued)

*Primary Examiner* — Hal Kaplan
(74) *Attorney, Agent, or Firm* — Andrus Intellectual Property Law

(57) ABSTRACT

The invention relates to a power supply unit (A) and a method for operating lighting means (6). The emergency power supply unit (A) for operating an emergency lighting means (6), preferably comprising at least one LED, the emergency power supply unit (A) comprising: an energy storage unit (2) configured to providing a battery supply voltage ($V_{Bat}$) in case of a mains voltage loss; a monitoring unit (12) configured to monitor the battery supply voltage ($V_{Bat}$) value; and a controlling unit (5) configured to control the operation of the emergency power supply unit (A) based on the actual battery supply voltage ($V_{Bat}$) value; wherein in a first operating mode of the emergency power supply unit (A), an emergency light (60) is switched-on; wherein in a second operating mode of the emergency power supply unit (A), the controlling unit (5) is non-operative and the emer-
(Continued)

gency light (60) is switched-off; and wherein in a third operating mode, the battery supply voltage ($V_{Bat}$) is galvanically isolated from the controlling unit (5) by a switching means (11).

26 Claims, 6 Drawing Sheets

(51) Int. Cl.
      *H02J 7/00*    (2006.01)
      *H02J 9/00*    (2006.01)
      *H02J 9/02*    (2006.01)
      *H02M 1/00*    (2006.01)

(52) U.S. Cl.
CPC ................ *H02J 9/02* (2013.01); *H02J 9/065* (2013.01); *H05B 33/0803* (2013.01); *H05B 33/0806* (2013.01); *H05B 33/0884* (2013.01); *H02J 2007/004* (2013.01); *H02M 2001/0032* (2013.01); *Y02B 70/16* (2013.01)

(58) Field of Classification Search
CPC ........... H02J 2007/004; H05B 33/0806; H05B 33/0884; H05B 33/0803; H02M 2001/0032; Y02B 70/16
See application file for complete search history.

(56) References Cited

FOREIGN PATENT DOCUMENTS

| | | |
|---|---|---|
| GB | 2499016 | 8/2013 |
| WO | 8604709 | 8/1986 |
| WO | 2012131368 | 10/2012 |
| WO | 2013191145 | 12/2013 |

OTHER PUBLICATIONS

International Search Report and Written Opinion in parent PCT application PCT/AT2016/050040 dated Aug. 26, 2016.

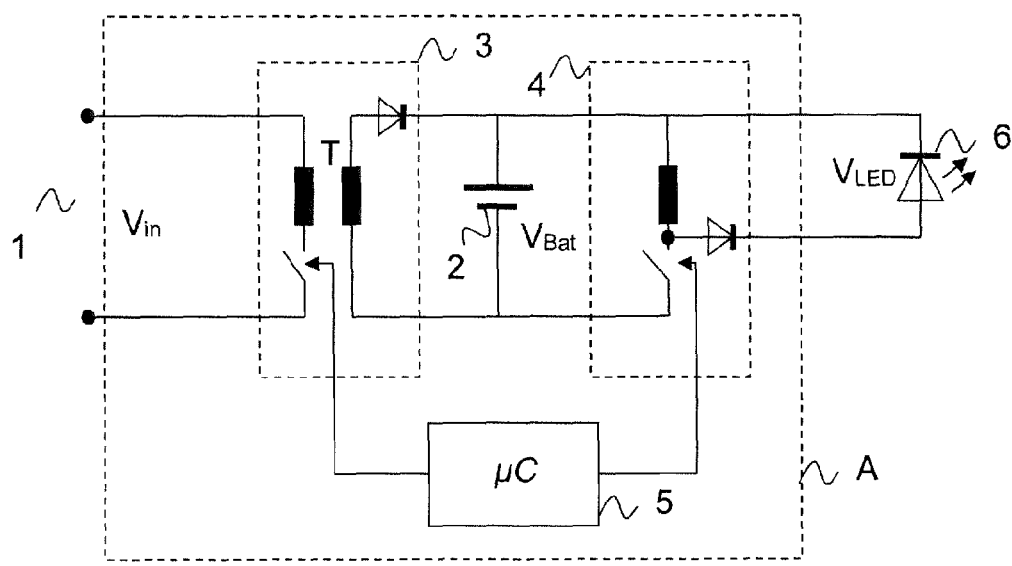
Fig. 1 - Prior Art
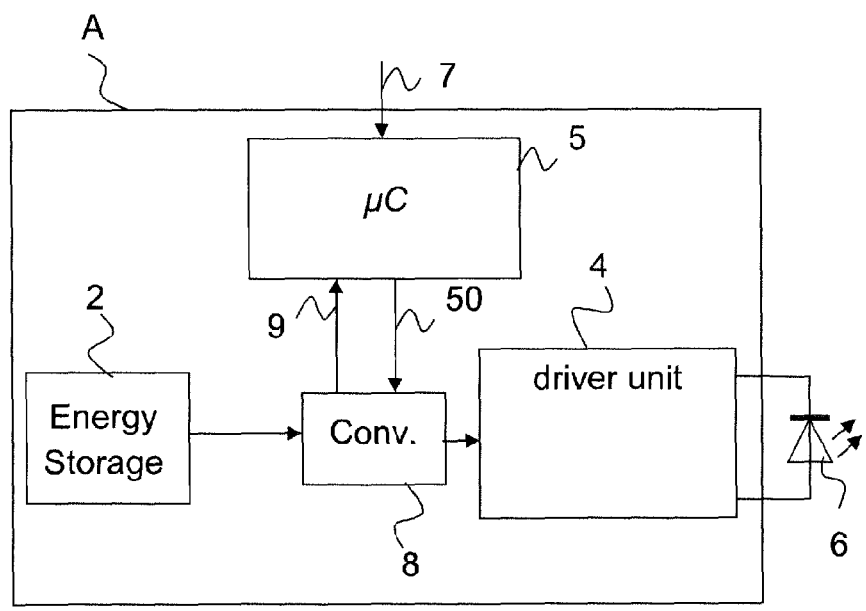
Fig. 2

EMERGENCY POWER SUPPLY UNIT AND METHOD FOR OPERATING AN EMERGENCY LIGHTING MEANS

CROSS REFERENCE TO RELATED APPLICATION

The present application is the U.S. national stage application of International Application PCT/AT2016/050040, filed Feb. 24, 2016, which international application was published on Sep. 1, 2016 as International Publication WO 2016/134396 A2. The International Application claims priority to Great Britain Patent Applications 1503685.8 filed Feb. 25, 2015 and 1600961.5 filed Jan. 18, 2016.

FIELD OF THE INVENTION

The invention relates to a power supply unit for a lighting means, especially an emergency lighting means, and a method for operating a lighting means.

The invention further relates to an emergency power supply unit—also known as emergency converter—, a method for operating an emergency lighting means and a method for activating an emergency power supply unit.

The invention is especially referred to ballasts for emergency lighting means, which are operated with at least one light-emitting diode, short: LED, in case of an emergency. Although the invention may especially be related to emergency lighting devices, the invention is generally applicable to normal lighting means, such as luminaires, and appropriate lighting systems.

BACKGROUND OF THE INVENTION

An important function of emergency lighting devices in a closed building is to illuminate emergency exits in case of an evacuation of the building is needed. Such scenarios might be a fire alarm or a mains voltage breakdown or the like. An emergency light device therefore comprises a self-sustaining voltage supply, which is used to supply energy to an emergency light source in case of the mains voltage loss. This voltage supply comprises an energy storage unit—e.g. a rechargeable battery—as its basic element, which is charged by means of a mains voltage supply unit during normal operating conditions and which is used as an energy supply in case of a mains voltage failure to supply the lighting means.

Such emergency lighting devices are well known from prior art document EP 2 249 459 A1. Therein a voltage supply is described which comprises an energy storage unit for supplying an emergency lighting means, a driving unit for driving the emergency lighting means, a charging unit for recharging the energy storage unit in normal-mode conditions and a control unit for controlling the emergency lighting device. In the known emergency lighting devices a boost converter is used to boost the voltage from the energy storage unit to a supply voltage, which is required for the controlling unit and the driving unit.

The controlling unit and the driving unit of the voltage supply are mainly built by integrated circuit devices.

To ensure a maximum lifespan of the energy storage unit, the control unit is configured to obtain operation commands to extinguish the emergency lighting means if the mains voltage supply still fails after a certain timespan. Such an operation command limits the number of continual charge/discharge cycles and reduces the stress on the emergency storage unit. According to standardized requirements, the maximum current drain of the energy storage unit shall not exceed a specific predetermined amount of current, if the emergency lighting device is operated based on such an operation command.

Additionally, there exist standardized operation commands to re-light the emergency lighting device. Some integrated circuit devices in the emergency lighting device therefore need to be operated with a start-up voltage above a certain voltage value. Other integrated circuit devices might not need such a high start-up voltage.

However, such high start-up voltages of the integrated circuit devices prohibit the predetermined maximum drain current value from not being exceeded and therefore nowadays voltage supplies for emergency lighting devices fail the standardized requirements.

As long as the voltage of the battery of the emergency device is higher than a first threshold, the energy supply unit is in a condition that a controlling unit is fully operative and the emergency lights are operated. As soon as the voltage falls below a given threshold value or a corresponding command is received from the first bus, the system will assume a so-called REST-mode in order to extinguish the emergency lights. However, the controlling unit is still operative. During this REST-mode, the controlling unit can still receive or send out commands. A typical power consumption in the REST-mode may be in the order of several Milliampere for a battery having a capacity of two ampere hours.

It is therefore an objective of the invention to provide a voltage supply unit for a lighting means which fulfills the standardized requirements, for instance using a first bus, for instance a digital addressable lighting interface, short DALI Another objective of the invention is to ensure that the standardized maximum current drain of the energy storage unit is not exceeded, for instance as defined in standard document EN 60598-2-22

Another objective of the invention is to drastically reduce the power consumption of an emergency power supply unit when a certain threshold voltage of a self-sustaining energy storage unit is undershot to relax the energy storage unit.

The invention should cover the requirements according to EN 61347-2-7 that are referred to lamp control gears and comprise particular requirements for energy storage unit supplied electronic control gear for self-contained emergency lighting devices.

The invention should cover the requirements according to EN 62034 that are referred to automatic test systems for energy storage unit powered emergency escape lighting devices.

The invention should cover the requirements according to EN62386-202 that are referred to the digital addressable lighting interface, DALI, particular requirements for the control gear and self-contained emergency lighting devices.

These objectives are solved by the technical features described herein.

SUMMARY OF THE INVENTION

The objective is especially solved by an emergency power supply unit for operating an emergency lighting means, preferably comprising at least one LED. The emergency power supply unit comprising an energy storage unit configured to provide a battery supply voltage in case of a mains voltage loss, a monitoring unit configured to monitor the battery supply voltage value and a controlling unit configured to control the operation of the emergency power supply unit based on the actual battery supply voltage value, wherein in a first operating mode of the emergency power supply unit, an emergency light is switched-on, wherein in a second operating mode of the emergency power supply unit, the controlling unit is operative and the emergency light is switched-off and wherein in a third operating mode, the battery supply voltage is galvanically isolated from the controlling unit by a switching means.

The term "power supply unit" is mainly refers to a ballast or a comparable device for feeding power to the lighting means.

The term "operative" for the controlling unit in the second operating mode means that the controlling unit is powered at least to be able to send and receive operational commands, to re-light the lighting means and/or to start/adjust timing units for providing timing values that indicate the time duration of an operating mode.

In a preferred implementation form of the invention, the first operating mode is activated if the monitoring unit detects that the battery supply voltage is above a first threshold voltage.

In another preferred implementation form of the invention, the second operating mode is activated if the monitoring unit detects that the battery supply voltage falls below a first threshold voltage or an activation command is received by the controlling unit, preferably a REST-mode command according to a lighting standard (DALI).

In another preferred implementation form of the invention, the third operating mode is activated if the monitoring unit detects that the battery supply voltage falls below a second threshold voltage that is below the first threshold voltage value.

In another preferred implementation form of the invention, the third operating mode is activated if a timeout-command provided by a timer-unit is received by the controlling unit.

Thus, the invention proposes a further even more power saving operating mode, the third operating mode. The third-operating mode is hereinafter also referred to as "quiescent mode".

Thus, a switching unit/means is added in series with the energy storage unit so that in an extremely low discharge state—the quiescent mode with current drains e.g. below 100 Microamperes, the main power consumers of the emergency power supply unit are cut off from the energy storage unit. This is different to the second operating mode, also known as the REST-mode, in which current draws several Milliamperes from the energy storage unit. In the second operating mode, the switching means would be closed, wherein in the third operating mode, the switching means would be open.

In this quiescent mode the controlling unit is galvanically isolated and/or physically separated from the energy storage unit, preferably by a switching means. Thus, in this quiescent mode the controlling unit is fully out of operation, so-called non-operative, and does not consume any power from the energy storage unit. As the controlling unit is not consuming any power anymore in the quiescent mode, the power consumption of the emergency power supply is drastically reduced down to a value of for example less than 100 Microamperes.

In another preferred implementation form of the invention, a transition from the third operating mode into the first operating mode is triggered by a mains voltage reset, preferably by supplying power to the emergency power supply unit. Thus, only when the mains voltage is connected again to the emergency power supply unit, the energy storage unit is charged again. A secondary power supply that is powered by the mains voltage for the start period will supply sufficiently power to the controlling unit, which in turn enables the controlling unit to send a switch command to the switching means for a reconnecting of the controlling unit to the energy storage unit.

The above-defined three different operating modes of the emergency power unit preferably relate to the emergency discharge mode, where the system is driven from the emergency voltage unit only and thus the system is in an emergency condition by not being supplied to a correct fully operative mains voltage.

In another preferred implementation form of the invention, the power supply unit comprises the energy storage unit for providing a first voltage of a first voltage value and further comprises a voltage converting unit which is configured to convert the first voltage into a voltage value higher than the first voltage value for operating the light source. The voltage supply comprises a control unit, wherein the control unit is supplied by a second voltage with a second voltage value. The voltage supply comprises a driving unit for driving the lighting means, wherein the driving unit is supplied by a third voltage with a third voltage value. The voltage converting unit converts the first voltage in dependence on a control signal of the control unit to a voltage value higher than the second voltage value or equal to the third voltage value or higher than the third voltage value.

In another preferred implementation form of the invention, the energy storage unit is a cell-based energy storage unit, which provides a first voltage in dependence on the number of cells. For instance the energy storage unit comprises three cells providing a first voltage with a first voltage value, e.g. 3.6 Volts.

In another preferred implementation form of the invention, the energy storage unit is a battery, wherein the battery is rechargeable with a mains voltage supply.

In another preferred implementation form of the invention, the controlling unit is an integrated circuit device such as a micro-controller or a field programmable gate array, short: FPGA, or an application-specific integrated circuit, short: ASIC, which is powered up by applying a second voltage with a second voltage value, e.g. a second voltage value of approximately 5 Volts.

In another preferred implementation form of the invention, the driving unit is an integrated circuit device, which is powered up by applying a third voltage with a third voltage value, e.g. a third voltage value of approximately 15 Volts.

The supply unit takes advantageously into account that the conversion of voltage values inherently causes energy losses, wherein the loss factor increases if the voltage value, to which the first voltage needs to be converted, is increased. Thus, the voltage supply is advantageously configured to convert the first voltage into a voltage value of a at least needed height to avoid unnecessary losses and to enable the needed operability. Therefore, the voltage supply according to the invention comprises a control unit that generates a control signal to the voltage converting unit in order to switch to different operation voltages, wherein a second voltage value is adjusted by the voltage converting unit, if only the control unit needs to be supplied and wherein a third voltage value is adjusted by the voltage converting unit, if the driving unit and the control unit needs to be supplied. The inventive power supply unit is therefore configured to convert into different voltages in dependence on the functionality which is needed.

Since the energy storage unit provides a first voltage which has a voltage value that is lower than the needed second and/or third voltage values in order to supply the control unit and/or the driving unit, the voltage converting unit is a boost voltage converting unit.

In another preferred implementation form of the invention, the third voltage value is higher than the second voltage value and the voltage converting unit is either configured to convert the first voltage into a voltage equal to or higher than the third voltage value or is configured to convert the first voltage into a voltage value in between the second voltage value and the third voltage value.

This ensures that the integrated circuit of the driving unit is not supplied with sufficient voltage and does therefore non-operate. Thus, the current drain from the energy storage unit is advantageously decreased. The controlling unit of the supply unit is still powered up and is able to receive and operate operation commands, since the controlling unit is permanently supplied with the second voltage.

In another preferred implementation form of the invention, the control signal is a voltage regulation output signal of the controlling unit and is applied to the boost voltage converting unit. This control signal of the controlling unit switches a voltage reference point in the voltage converting unit and therefore converts the first voltage to a voltage value higher than the third voltage or to a voltage value in between the second voltage value and the third voltage value.

This voltage regulation output signal drives a voltage regulation switch in the voltage converting unit. The voltage regulation switch preferably is a Field Effect Transistor, short FET, which is applied to a voltage dividing circuit of the voltage converting unit in order to switch a voltage reference potential to a value higher than the second voltage value or equal to the third voltage value or higher than the third voltage value.

In another preferred implementation form of the invention, the controlling unit is configured to receive at least an operating command, wherein on receiving a first operation command, the control signal is switched to a first control signal value and wherein upon receiving a second operation command the control signal is switched to a second control signal value.

According to the DALI standardized requirements, such as EN 61347-2-7 or EN 62034 or EN 62386-202, an emergency lighting device must fulfill a REST-mode command with a predetermined maximum current drain value over a specific time duration as well as a re-light command in order to activate the driving unit and re-light the emergency light sources.

Advantageously, the voltage converting unit of the supply unit can now be switched to a lower supply voltage value by the control signal in case the controlling unit obtains an appropriate command and furthermore can be switched to a higher supply voltage value if a re-light command occurs. This voltage supply does therefore not cause unnecessary losses in the REST-mode, since the driving unit is not powered in REST-mode. The REST-mode is the previously mentioned second operating mode.

Appropriate standards for such a DALI-interface are defined in the EN62034, the IEC60929 and/or the IEC62386. During the REST-mode of the supply unit, the controlling unit is advantageously still powered up and is enabled to operate automatic testing and monitoring applications, which improves the functionality of the emergency lighting device. During this REST-mode that might be triggered by the monitoring unit or by a command, the controlling unit can still receive or send out operation commands and a timing unit will time the time duration lapsed since initiating the REST-mode.

In the third operating mode the controlling unit is galvanically isolated from the energy storage unit. Thus, in this quiescent mode—which is one of the three emergency modes of the power supply unit when the mains voltage is lost—the controlling unit is fully out of operation and does not consume any power. This quiescent mode can be triggered by either the energy storage voltage falling below the second threshold voltage that is lower than the first threshold voltage of for example 0.9 volts and/or triggered by a timeout command from the timer, which can be for example several days of being in second operating mode.

In another preferred implementation form of the invention, the first operation command is a REST-mode command as previously described. Therefore, the voltage converting unit converts the first voltage into a voltage with a voltage value lower than the third voltage value and higher than the second voltage value. The REST-mode command is used to ensure an exceeded lifespan of the energy storage unit. To fulfill the REST-mode requirement it is necessary to ensure that the current drain from the energy storage unit in REST-mode does not exceed a predetermined value.

According to standard EN 60598-2-22 and referring to clause 22.6.18, the current drain in REST-mode (measured in amperes A) shall not exceed:

for lead-acid batteries $4 \cdot 10^{-5} \cdot C_{20} \cdot A$, where $C_{20}$ is the battery capacity in ampere hours for a 24 hour constant current discharge;

for nickel-cadmium batteries $0.0015 \cdot C_5 \cdot A$, where $C_5$ is the battery capacity in ampere hours for a 5 hour constant current discharge.

If the REST-mode command is received by the controlling unit, the emergency lighting means are switched off. Thus, also the driving unit can be switched off which is achieved by switching the supply voltage to a value below the third voltage value.

Since the controlling unit itself is supplied by a second voltage much lower than the third voltage value of the driving unit, the voltage converting unit is switched to convert the first voltage into a voltage higher than the second voltage value but lower than the third voltage value in order to avoid unnecessary losses and therefore fulfill the REST-mode requirement.

In another preferred implementation form of the invention, the controlling unit is further configured to drive a second lighting means. Thus, it is possible to combine the supply of a normal lighting means with the supply of an emergency lighting means to reduce the number of separate power supply devices and in conclusion to reduce the manufacturing costs of such lighting devices.

In another preferred implementation form of the invention, the voltage converting unit is based on a fly-back converter technique. This fly-back converter technique is used to efficiently drive the light source.

In another preferred implementation form of the invention, the controlling unit is configured to determine a mains voltage loss. The energy storage unit of the voltage supply is configured to provide the voltage of the first voltage value if the mains voltage loss is determined.

The above-identified objectives are further solved by a method for operating an emergency lighting means, preferably comprising at least one LED, by means of a emergency power supply unit, wherein the method comprises the following method steps: providing a battery supply voltage in case of a mains voltage loss; monitoring the battery supply voltage value; and controlling the operation of the emergency power supply unit based on the actual battery supply voltage value, wherein in a first operating mode of the emergency power supply unit, an emergency light is switched-on, wherein in a second operating mode of the emergency power supply unit, the emergency power supply unit is non-operative and the emergency light is switched-off and wherein in a third operating mode, the battery supply voltage is galvanically isolated from the controlling unit by a switching means.

The above-identified objectives are further solved by a method for operating a light source, especially an emergency light source. The method comprises the following method steps: Providing a first voltage with a first voltage value by means of an energy storage unit; and converting the first voltage into a voltage value higher than the first voltage value for operating the light source by means of a voltage converting unit. The voltage supply comprises a control unit, wherein the control unit is supplied by a second voltage with a second voltage value. The voltage supply comprises a driving unit for driving the light source, wherein the driving unit is supplied by a third voltage with a third voltage value. The voltage converting unit converts the first voltage in dependence on a control signal of the control unit to a voltage value higher than the second voltage value or equal to the third voltage value.

The above-identified objectives are further solved by a method for activating a power supply unit as previously described, wherein upon finishing the manufacturing of the power supply unit, the third operating mode is activated. Thus, if an emergency supply unit may be shipped from the manufacturing side with the energy storage unit already connected and in place, the system can be automatically put in the third operating mode.

BRIEF DESCRIPTION OF THE DRAWINGS

In the following exemplary embodiments of the invention are described with reference to drawings. Those exemplary embodiments do not limit the scope of the invention. The same reference signs in different drawings indicate the same elements or at least the same functions unless otherwise stated.

FIG. 1 shows an embodiment of a power supply unit for operating lighting means according to the prior art.

FIG. 2 shows a first exemplary embodiment of a power supply for operating lighting means according to the invention.

DETAILED DESCRIPTION OF THE PREFERRED EMBODIMENTS

Figure 3:
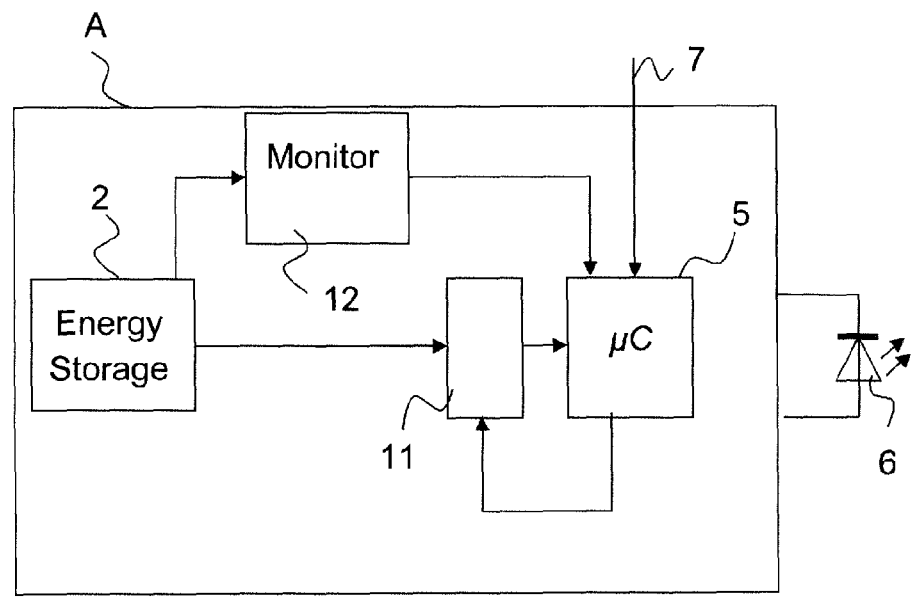
FIG. 3 shows a second exemplary embodiment of a power supply for operating lighting means according to the invention.

In FIG. 1 a power supply A for a lighting means 6 according to the prior art is described. Therein an LED as a lighting means 6 is shown. The power supply unit A according to FIG. 1 is mainly used in an emergency lighting device. The power supply unit A is connected to a mains voltage supply 1 on its input side. The mains voltage might be an alternating current voltage $V_{in}$ with a voltage value of 230 Volts. Other voltage values according to different mains standards are also applicable. According to FIG. 1 a controlling unit 5, an energy storage unit 2, a charging unit 3 and a driving unit 4 for driving the lighting means 6 are shown.

The charging unit 3 is built as a fly-back converter and therefore comprises a transformer T with a primary winding and a secondary winding. The primary winding of the transformer T comprises a switch, which is controlled by the controlling unit 5. By opening and closing the switch of the charging unit 3, the energy from the mains voltage supply 1 is transferred to the secondary side of the fly-back converter in the charging unit 3. This provided energy is used to charge the energy storage unit 2, herein illustrated as a rechargeable battery providing a first voltage $V_{Bat}$. The first voltage $V_{Bat}$ is a direct current voltage with a value in dependence on the number of cells of the battery. For instance the battery comprises three cells and provides a first voltage of 3.6 Volts. The transfer of energy occurs in the opened switch state. A diode on the secondary side of the charging unit 3 is further used to avoid an unwanted re-coupling. The control of the switch in the charging unit 3 is obtained by the controlling unit 5, which might be a micro-controller or an FPGA or an ASIC. For a galvanic isolation, the switch of the primary winding of the transformer T might be controlled using an opto-coupler device.

The energy storage unit 2 is permanently charged, if mains voltage is applied to the power supply unit A. Just in case the mains voltage supply 1 drops below a certain value, especially in case of a mains voltage loss, the emergency-light modes of the power supply unit A are entered. Accordingly, the lighting means 6 is driven by the driving unit 4. The driving unit 4 is also built as a fly-back converter having a second switch and an inductance L to provide energy to the lighting means 6 in a most efficient manner.

Referring to FIG. 2, a power supply unit A according to the invention on basis of a first exemplary embodiment is shown in greater details. Herein the controlling unit 5 comprises a DALI standardized interface 7 to receive operation commands, especially for automatic testing and monitoring purposes. A specific timing management of the power supply unit A can furthermore be achieved by the use of the DALI standardized interface 7. The power supply unit A according to FIG. 2 also comprises the energy storage unit 2, which provides the first voltage $V_{Bat}$ of a first voltage value. The first voltage value is approximately 3.6 Volts and dependent on the battery size and number of cells.

To drive the lighting means 6, a driving unit 4 is used. This driving unit 4 needs to be supplied with a third voltage $V_{CC}$ with a third voltage value. This third voltage $V_{CC}$ is equal to or higher than the first voltage value and might be 15 Volts. To convert the lower first voltage value to the third voltage value $V_{CC}$, a boost voltage converting unit 8 is used. In emergency light condition, where the lighting means 6 has to be activated, the boost voltage converting unit 8 converts the first voltage $V_{Bat}$ to the third voltage $V_{CC}$ with a voltage value higher than the third voltage value by means of another fly-back converter. Therefore, in case of mains voltage supply and battery supply application, the controlling unit 5 enables the boost voltage converting unit 8.

The controlling unit 5 comprises a control signal output to apply a control signal 50 to the boost voltage converting unit 8. In case the lighting means 6 needs to be switched on, the controlling unit 5 uses a first control signal value of the control signal 50. This first control signal value forces the voltage converting unit 8 to convert the first voltage $V_{Bat}$ of the energy storage 2 to the third voltage $V_{CC}$ with a third voltage value to drive the lighting means 6 by the driving unit 4.

Additionally, the boost voltage converting unit 8 also supplies a second voltage $V_{DD}$ to the control unit 5. This second voltage $V_{DD}$ comprises a second voltage value, which is lower than the third voltage value. Typically the second voltage $V_{DD}$ has a voltage value of 5V. Therefore, a voltage regulation circuit 10 is obtained in the boost voltage converting unit 8 to reduce the third voltage value.

If the controlling unit 5 determines a mains voltage loss or receives an appropriate command via the DALI standardized interface 7, the voltage supply A is able to drive the driving unit 4 by supplying the third voltage $V_{CC}$. The voltage supply A is further able to supply the second voltage $V_{DD}$ to the control unit 5 simultaneously. The power supply unit A now operates in a first operating mode of the available three emergency modes, if a monitoring unit 12 (not shown in FIG. 2) detects that the battery voltage value of the energy storage unit 2 is not below a first threshold voltage value, such as 1.2 Volts.

Once the energy storage unit 2 has been drained by the driving unit 4 below a first voltage threshold, such as 1.2 Volts, or a REST-mode command has been received by the control unit 5 via the DALI standardized interface 7, the control unit 5 changes the control signal 50 to a another value to indicate to the boost voltage converting unit 8 that only the second voltage $V_{DD}$ needs to be generated. Now the power supply unit A operates in a second operating mode of the available three emergency modes.

Thus, the control signal 50 achieves a change of a voltage reference potential on a voltage regulation point 81 in the boost voltage converting unit 8. According to the changed control signal value, the boost converting unit 8 does not further provide the third voltage $V_{CC}$ to the driving unit 4 and therefore switches-off the lighting means 6. The energy consumption is reduced since the voltage regulation point is switched and the boost voltage converting unit 8 now provides a voltage in between the second voltage value and the third voltage value, preferably a voltage value higher but close to the second voltage value, e.g. 6 Volts, to still supply the control unit 5. As a conclusion, the REST-mode requirements according to standard EN 60598-2-22 in clause 22.6.18 are met and the control unit 5 is still supplied with the second voltage $V_{DD}$ to further receive DALI-commands via the DALI-standardized interface 7.

In case the controlling unit 5 obtains a re-light-command via the DALI-standardized interface 7, the controlling unit 5 again changes back the control signal value in order to regulate the voltage reference at the voltage regulation point 81 in the boost voltage converting unit 8 to a voltage value on which the driving unit 4 is supplied and can re-power. The driving unit 4 then drives the lighting means 6.

In FIG. 3 a second exemplary embodiment of the power supply unit A for a lighting means 6 is illustrated. Here, mainly the function of the third operation mode, the "quiescent mode" is described in greater details. It should be noted that the functions according to FIG. 2 might be incorporated in the embodiment according to FIG. 3 as well. In FIG. 3 the energy storage unit 2 provides its battery voltage $V_{Bat}$ to a monitoring unit 12. The monitoring unit 12 detects the height of the battery voltage $V_{Bat}$ value. The monitoring unit 12 provides the monitoring results to the controlling unit 5. In case the battery voltage value $V_{Bat}$ falls below the first threshold value or a REST-mode command is received, the controlling unit 5 extinguishes the lighting means 6 to reduce the power consumption and avoid energy storage unit 2 destruction.

The invention now proposes a third operating mode to even more save power, which is called the "quiescent mode". In this quiescent mode the controlling unit 5 is galvanically isolated from the energy supply unit 2 by switch 11. Thus, in this "quiescent mode" the controlling unit 5 is fully out of operation and does not consume any power from the energy supply unit 2. This quiescent mode can be triggered by either the battery voltage $V_{Bat}$ falling below a second threshold voltage (lower than the first threshold voltage) of for example 0.9 volts which is monitored by the monitoring unit 12. Additionally or alternatively, it is triggered by a timeout command from a timer of the controlling unit 5 or received by the DALI interface 7, which can be for example 21 days of being in the REST-mode. As the controlling unit 5 is not consuming any power anymore in the quiescent mode, the power consumption of the system is drastically reduced down to a value of for example less than 100 microamperes.

The system A is still consuming some power for example due to the fact that battery voltage monitoring unit 12 may still be connected to the energy storage unit 2 which, although being high ohmic, consumes some power.

The emergency power supply unit A might have various operating conditions dependent on the battery voltage per cell of the energy storage unit 2 and whether it is in charging or discharging mode.

The table 1 below defines these according to the voltage, per cell, of the pack connected along with the operating mode.

| Battery V/Cell | Converter State |
|---|---|
| >1.85 V | Faulty (Charging) |
| >1.65 V | Gassing (Charging) |
| 1.2 V | Nominal (Charging/Discharging) |
| 1.05 V | LVBCO/Rest (Discharging) |
| 0.9 V | QVBCO (Discharging) |
| 0.8 V | Standard Limit (Discharging) |

The abbreviation LVBCO means "Low Voltage Battery Cut Off". The abbreviation QVBCO means "Quiescent Voltage Battery Cut Off".

The requirements for Nickel metal hybrid, NiMh, batteries have changed in recent releases of emergency standards to restrict the discharge current from the battery when it is near exhaustion after discharge event. This is because the battery chemistry is sensitive to deep discharge below 0.8V/cell and can result in permanent damage.

Additionally similar limits for discharge apply when a REST command is sent to the controlling unit 5. This REST-mode is used particularly in Southern Europe where long mains voltage periods in building result in the need to preserve the battery power when the building is isolated from the AC supply. The REST-command switches off the power supply unit A; it is sent while the unit A is in emergency mode. The INHIBIT-command is sent while the unit A is in standby and prevents the next emergency event being actioned when the mains supply 1 is removed. The target is typically to remove no more than 50% of the battery capacity during the period in REST mode.

It is also preferred in REST-mode that for a period after operation the unit can communicate such as with DALI and also self-test timers are maintained.

In EN 61347-2-7 a new clause for LVBCO has been defined. This means that once the unit A finishes its emergency operation and turns off at 0.8V per cell, via the LVBCO there is a new clause that stipulates a very low discharge current drain on the battery 2, the so called quiescent mode, where discharge current must be typically lower than 50 Microamperes from calculation, which is battery capacity dependent. This is a requirement in the standard to protect the battery and must be met. Additionally in this state there is no requirement to communicate or maintain timers.

The LVBCO level for the second operating mode is therefore set at 1.05V per cell in order that a percentage of the battery capacity, typically 5 to 10%, is maintained after LVBCO in order to enable the controlling unit 5, as an example of logic circuits such as microcontroller to be maintained for a period. This enables communication and timers to be supported.

In this intermediate state there is no limit for battery discharge however the target is to keep this low by switching microcontrollers to low frequency mode and disabling peripherals which are not required. The target is to maintain timers for 7 days as defined in IEC62034.

A target performance during a battery discharge might therefore be as follows:
1.05V-1.85V (First threshold)
  Lamp operation in emergency mode;
0.9V-1.05V REST-Mode (second operating mode)
  (Communication is active (at least part time) and timers are active);
below 0.9V (second threshold)
  Quiescent State (Communications are off and the timers off)

A target performance during a battery discharge after a REST command:
1.2V-1.85V (first threshold)
  $I<10^{-3}C5A$ (2 mA for a 2Ah NiMh)
below 0.9V or after 21 days (second threshold)
  $I<25\times10^{-3}C5A$ (50 uA for a 2 Ah NiMh)

Thus, following key features are available:
At 0.8V/cell in emergency it is now possible to reach below 50 uA according to EN61347-2-7 Clause 23;
At 0.9V-1.05V/cell in emergency, it is now possible to communicate according to DALI standard EN62386-202 and timers/functions according to EN62034 are maintained;
At 1.05V-1.85V/cell in REST mode it is now possible to reach below 2 mA according to EN61347-2-7 Clause 25;
At <0.9V/Cell or after 21 days in REST mode it is now possible to reach below 50 uA according to EN61347-2-7 Clause 23.

Figure 4:
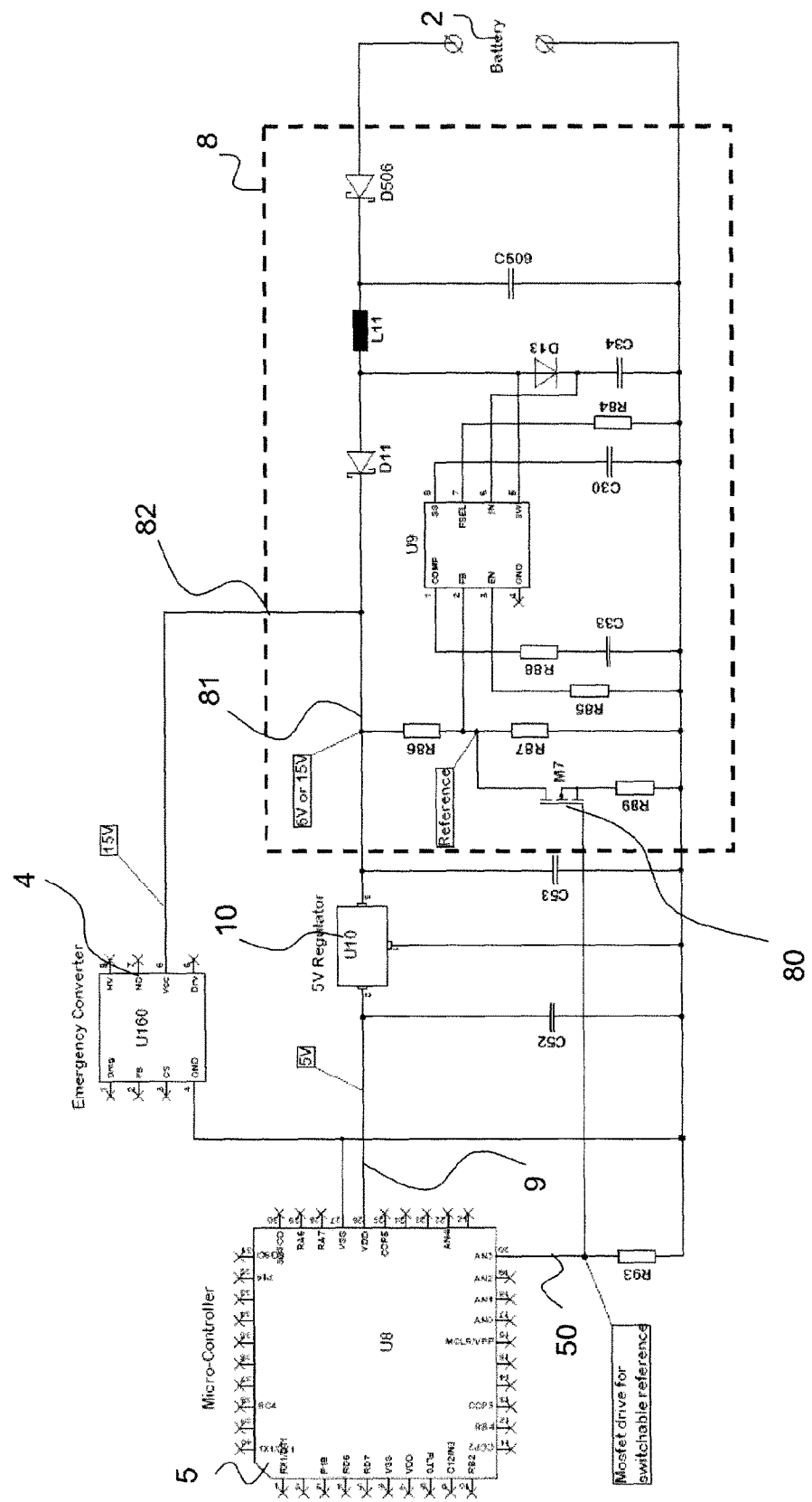
FIG. 4 shows a third exemplary embodiment of a power supply for operating lighting means according to the invention.

In FIG. 4 a third exemplary embodiment of the power supply unit A for a lighting means 6 is illustrated. The exemplary embodiment according to FIG. 4 is based on the exemplary embodiment according to FIG. 2. The lighting means 6 is not shown. The controlling unit 5 is shown as a 40 pins integrated circuit U8. The driving unit 4 is shown as an 8 Pin integrated circuit U160. A voltage regulator U10 for lowering the voltage to the second voltage $V_{DD}$ with a second voltage value of 5 Volts is also shown. The boost voltage converting unit 8 is shown in dotted lines and is connected to the energy storage unit 2. The controlling unit 5 comprises the control signal output which switches the voltage regulation switch 80 of the boost voltage converting unit 8. The voltage regulation switch 80 is a MOSFET M7. In dependence on the control signal value, the MOSFET M7 is either activated or deactivated, which subsequently influences the voltage drops at the voltage divider unit consisting of resistors R86, R87 and R89. Thus, the voltage at the voltage regulation point 81 is dependent on the state of the MOSFET M7.

As previously stated, the controlling unit 5 switches the voltage regulation point 81 with the control signal 50. In case the control signal 50 switches the MOSFET M7 to a high-resistant state, the voltage regulation point 81 comprises a voltage level, which is dependent on the resulting voltage of the resistors R86 and R87. Thus, the voltage value of 15 Volts at the voltage regulation point is achieved, which inherently leads to a supply voltage high enough to supply the driving unit 4 for driving the lighting means 6 (not shown) with the third voltage $V_{CC}$. Furthermore, the voltage regulator 10 obtains a 15V input and outputs a 5V voltage value as the second voltage $V_{DD}$ to supply the control unit 5. Therefore, the driving unit 4 and the controlling unit 5 are powered by the energy storage unit 2 in case the MOSFET M7 is switched to a high-resistant state.

In case the control unit 5 obtains the REST-mode command via the DALI-standardized interface 7, the control signal 50 changes its value in order to switch-on the voltage regulation switch 80. Therefore the MOSFET M7 is in a low-resistant state, which leads to a change of voltage value at the voltage regulation point 81. The voltage regulation point 81 is now built by a voltage divider built by the resistors R86, R87 and R89.

In this exemplary embodiment, the resulting voltage is therefore reduced from a value of 15 Volts to a value of 6 Volts. The reduction should at least lead to a voltage value below the third voltage value. Thus the driving unit 4 is not supplied with enough supply voltage and subsequently the lighting means 6 is switched off. The reduced regulated voltage is still high enough to supply the control unit 5 in order to obtain further commands via the DALI-standardized interface 7. In this REST-mode the energy storage unit 2 is able to meet the requirements according to standard EN60598-2-22.

Upon receiving a re-light command via the DALI-standardized interface 7, the control signal 50 is switched back to the higher value in order to switch the MOSFET M7 to a high-resistant state and to boost back to a voltage value of 15 Volts at the voltage regulation point 81. As a conclusion, the voltage supply for the driving unit 4 increases to 15V and therefore the driving unit 4 re-activates the lighting means 6.

It should be noted that the use of a voltage divider and a MOSFET in order to adjust different voltage regulation voltages at the voltage regulation point 81 is just an exemplary way to achieve the inventive solution. Other voltage regulation possibilities are not excluded herewith.

Figure 5:
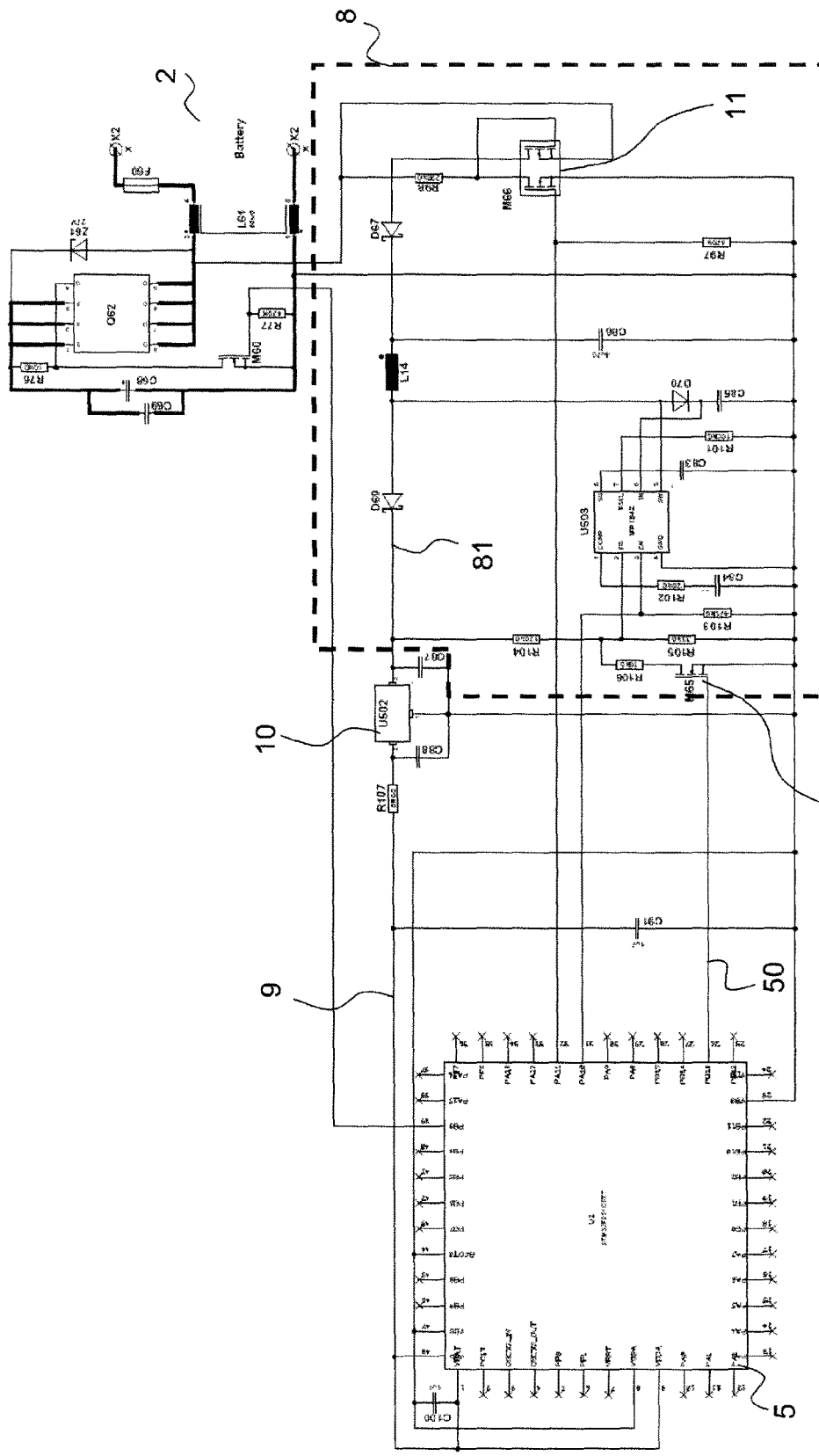
FIG. 5 shows a fourth exemplary embodiment of a power supply for operating lighting means according to the invention.

In FIG. 5 a fourth exemplary embodiment of the power supply unit A for a lighting means 6 is illustrated. In the following, only the differences to FIG. 4 are explained. The exemplary embodiment according to FIG. 5 is based on the exemplary embodiment according to FIG. 3.

The circuit diagram shows a typical implementation of the quiescent switch solution employed in most high tier products. There are two switches Q62, M66 employed in the battery circuit. The device Q62 is used to isolate the battery 2 (not shown) from the controlling unit 5. It is typically used additionally to prevent reverse battery or short circuit battery from affecting the design. This switch Q62 would normally be closed on mains application and after the state of the battery is confirmed. This switch Q62 in some designs is also used to pulse charge the battery 2 such as if it is very deep discharged or if pulse algorithm is needed to support NiMh battery solution.

The FET M66 is the quiescent mode switch 11 and is used to power the controlling unit 5 and the voltage converting unit 8. When the battery 2 is first connected this switch 11 is open and no power is offered to the controlling unit 5 and the voltage converting unit 8. On mains application the switch 11 is triggered closed by the controlling unit 5 which is powered off mains. The switch 11 remains on until the battery level reaches 0.9V per cell at which state it is switched off reducing current draw. In the interim period of 1.05V to 0.9V all ancillary circuits are switched off to limit current draw of the design and to enable communication and timers to be maintained for the longest period possible, ideally 7 days.

Figure 6:
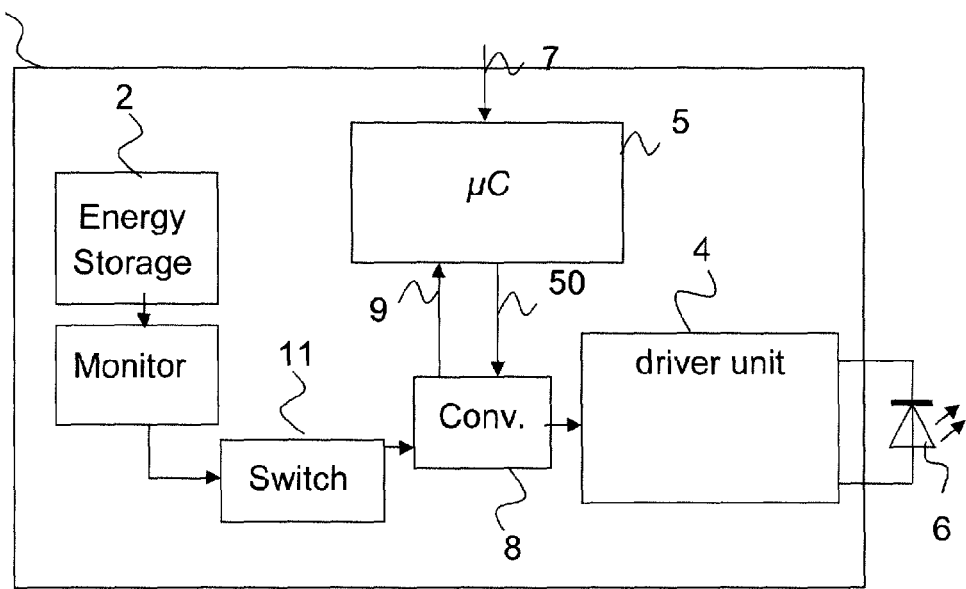
FIG. 6 shows a fifth exemplary embodiment of a power supply for operating lighting means according to the invention.

Referring to FIG. 6 a fifth exemplary embodiment of the inventive power supply A is shown. Here, the combination of FIG. 2 and FIG. 3 is shown in greater detail. To avoid unnecessary repetitions, it is referred to the description of FIG. 2 and FIG. 3 accordingly.

Figure 7:
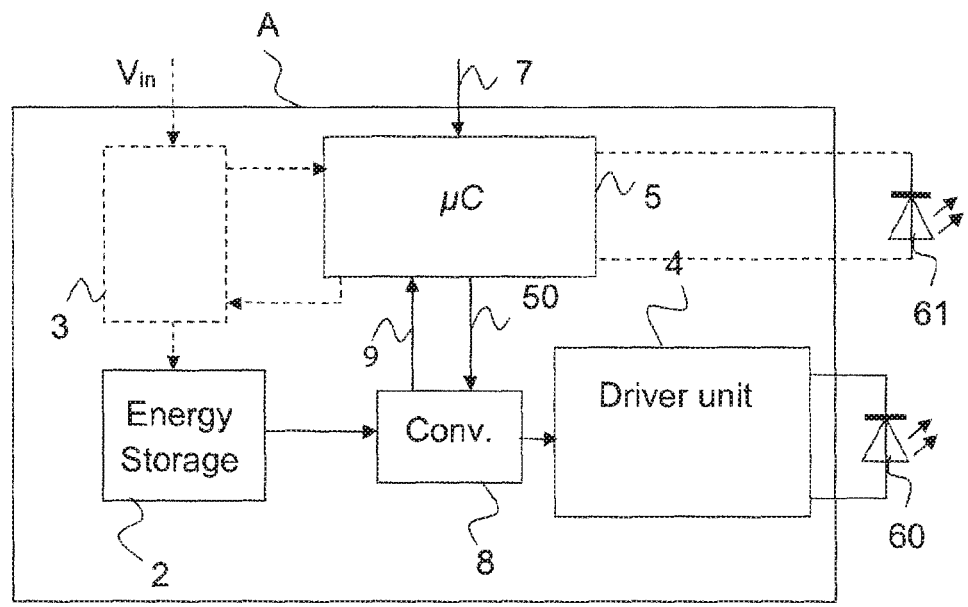
FIG. 7 shows a sixth exemplary embodiment of a power supply for operating lighting means according to the invention.

Referring to FIG. 7 a sixth exemplary embodiment of the inventive power supply unit A is shown. According to FIG. 7 the charging unit 3 is part of the power supply unit A and is therefore able to charge the energy storage 2 in normal mode operations according to the embodiment according to FIG. 1. Therefore a normal lighting means 61 is driven by the controlling unit 5. Just in case a mains voltage loss is determined, the controlling unit 5 switches the control signal 50 to the boost voltage converting unit 8 as described previously, and the driving unit 4 illuminates the emergency lighting means 60.

Using the embodiment according to FIG. 7, it is possible to merge two different power supplies into one power supply unit A. As a conclusion, manufacturing costs are reduced and space consumption is avoided.

Figure 8:
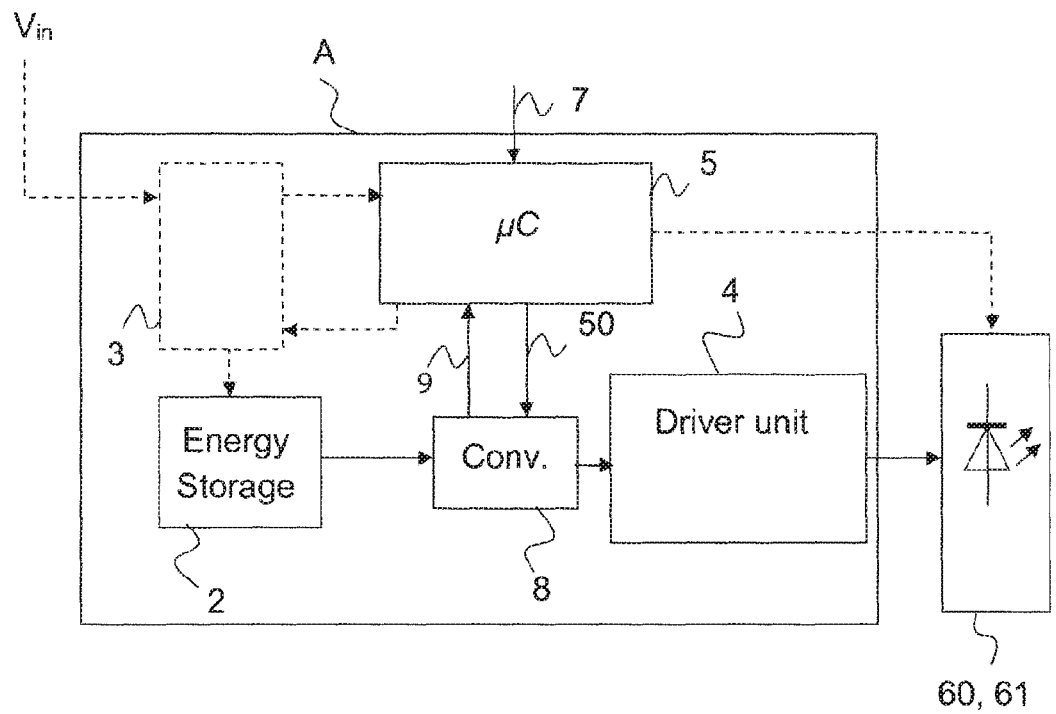
FIG. 8 shows a seventh exemplary embodiment of a power supply for operating lighting means according to the invention.

In FIG. 8 a seventh exemplary embodiment of the power supply unit A according to the invention is shown. The lighting means 6 according to FIG. 8 is driven as normal lighting means 61 and emergency lighting means 60. Alternatively, a lighting means array is used which merges emergency lighting means 60 and normal lighting means 61 into one housing. The controlling unit 5 operates the normal lighting means 61 during normal operation modes as shown with dotted lines in FIG. 8. In case an emergency lighting situation is determined, the same lighting means 6 is now driven by the driving unit 4, maybe with reduced light power.

The lighting means 6 according to the invention is preferably an LED. The lighting means 6 according to the invention further represents an LED array or LED string. Other lighting means techniques are not excluded herefrom.

All features of all embodiments described, shown and/or claimed herein can be combined with each.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

REFERENCE SIGNS

1 A (Emergency-lighting) power supply unit
2 Mains voltage supply
3 Energy storage unit, battery
4 Charging unit
5 Driving unit, fly-back-converter
50 Controlling unit
6 control signal, voltage regulation output
60 Lighting means
60 First lighting means, emergency light source
61 Second lighting means, normal light source
7 DALI-standardized interface
8 Voltage converting unit
80 Voltage regulation switch
81 Voltage regulation point
82 Voltage Supply for Emergency Converter
9 Voltage Supply for control unit
10 Voltage regulation unit
11 Switching means
12 Monitoring unit
$V_{Bat}$ First voltage, Battery voltage
$V_{DD}$ Second voltage, Supply Voltage for Control Unit
$V_{CC}$ Third voltage, Supply voltage for driving unit
DALI Digital Addressable Lighting Interface
T Transformer

The invention claimed is:

1. An emergency power supply unit (A) for operating an emergency light (6), comprising at least one LED, the emergency power supply unit (A) comprising:
   an energy storage unit (2) configured to provide a battery supply voltage ($V_{Bat}$) in case of a mains voltage supply loss, wherein the emergency power supply unit (a) detects a battery supply voltage value;
   and
   a controlling unit (5) configured to control the operation of the emergency power supply unit (A) based on the actually monitored battery supply voltage ($V_{Bat}$) value;
   wherein in a first operating mode of the emergency power supply unit (A), an emergency light (6) is switched-on;
   wherein in a second operating mode of the emergency power supply unit (A), the controlling unit (5) is operative and the emergency light (6) is switched-off;
   and
   wherein in a third operating mode, the battery supply voltage ($V_{Bat}$) is galvanically isolated from the controlling unit (5) by a switching means (11).

2. The emergency power supply unit (A) according to claim 1, wherein the first operating mode is activated if the detected battery supply voltage ($V_{Bat}$) is above a first threshold voltage.

3. The emergency power supply unit (A) according to claim 2, wherein the third operating mode is activated if the detected battery supply voltage ($V_{Bat}$) falls below a second threshold voltage that is below the first threshold voltage value.

4. The emergency power supply unit (A) according to claim 1, wherein the second operating mode is activated if the detected battery supply voltage ($V_{Bat}$) falls below a first threshold voltage or an activation command is received by the controlling unit (5).

5. The emergency power supply unit (A) according to claim 1, wherein the third operating mode is activated if a timeout-command provided by a timer-unit is received by the controlling unit (5).

6. The emergency power supply unit (A) according to claim 1, wherein power consumption in the second operating mode is at least ten times higher than in the third operating mode.

7. The emergency power supply unit (A) according to claim 1, wherein the controlling unit (5) is configured to determine the mains voltage supply loss and wherein after the determination of the mains voltage supply loss the energy storage unit (2) is configured to provide the battery supply voltage ($V_{Bat}$).

8. The emergency power supply unit (A) according to claim 1, wherein the energy storage unit (2) is a battery, wherein the battery is rechargeable with a mains voltage supply (1).

9. The emergency power supply unit (A) according to claim 1, wherein a transition from the third operating mode into the first operating mode is triggered by a mains voltage reset.

10. The emergency power supply unit (A) according to claim 1, wherein the controlling unit (5) is configured to drive another light.

11. The emergency power supply unit (A) according to claim 1, wherein the supply unit (A) further comprises a driving unit (4) for driving the emergency light (6), wherein the driving unit (4) is controlled by the controlling unit (5).

12. A method for operating an emergency light (6), comprising at least one LED, by means of an emergency power supply unit (A), wherein the method comprises the following method steps:
providing a battery supply voltage ($V_{bat}$) in case of a mains voltage loss;
monitoring the battery supply voltage ($V_{Bat}$) value; and
controlling the operation of the emergency power supply unit (A) based on the actual battery supply voltage ($V_{Bat}$) value;
wherein in a first operating mode of the emergency power supply unit (A), the emergency light (6) is switched-on;
wherein in a second operating mode of the emergency power supply unit (A), the emergency power supply unit (A) is non-operative and the emergency light (6) is switched-off; and
wherein in a third operating mode, the battery supply voltage ($V_{Bat}$) is galvanically isolated from the controlling unit (5) by a switching means (11).

13. The method according to claim 12, wherein the first operating mode is activated by the controlling unit (5) upon receiving of an operation command through a DALI compliant interface.

14. The method according to claim 12, wherein the first operating mode is activated by the controlling unit (5) upon detecting that the battery supply voltage ($V_{Bat}$) is above a first threshold voltage.

15. The method according to claim 12, wherein a transition from the third operating mode to the first operating mode is triggered by a mains voltage reset.

16. An emergency power supply unit (A) for operating an emergency light (6), comprising at least one LED, the emergency power supply unit (A) comprising:
an energy storage unit (2) for providing a first voltage (VBat) of a first voltage value; and
a voltage converting unit (8) which is configured to convert the first voltage (VBat) into a voltage value higher than the first voltage value, for operating the light (6);
wherein:
the emergency power supply unit (A) comprises a control unit (5), wherein the control unit (5) is supplied by a second voltage (VDD) with a second voltage value;
the emergency power supply unit (A) comprises a driving unit (4) for driving the light (6), wherein the driving unit (4) is supplied by a third voltage (VCC) with a third voltage value; and
the voltage converting unit (8) converts the first voltage (VBat) in dependence on a control signal (50) of the control unit (5) to a voltage value higher than the second voltage value or equal to the third voltage value.

17. The emergency power supply unit (A) according to claim 16, wherein the control signal (50) is switched in accordance with an operation command, which is received at the control unit (5).

18. The emergency power supply unit (A) according to claim 16, wherein the third voltage value is higher than the second voltage value and wherein the voltage converting unit (8) is either configured to:
convert the first voltage (VBat) into a voltage equal to or higher than the third voltage value; or
convert the first voltage (VBat) into a voltage value in between the second voltage value and the third voltage value.

19. The emergency power supply unit (A) according to claim 16, wherein the control unit (5) is configured to receive operation commands through a DALI compliant interface; and wherein upon receiving a first operation command, the control signal (50) is switched to a first control signal value; and wherein upon receiving a second operation command the control signal (50) is switched to a second control signal value.

20. The emergency power supply unit (A) according to claim 19, wherein the first operation command is a REST-mode command and wherein the voltage converting unit (8) converts the first voltage (VBat) into a voltage with a voltage value lower than the third voltage value and higher than the second voltage value.

21. The emergency power supply unit (A) according to claim 19, wherein upon receiving the first operation command, the current drain from the energy storage unit (2) does not exceed a predetermined current value.

22. The emergency power supply unit (A) according to claim 19, wherein the second operation command is a Re-light command according to a lighting standard (DALI) and wherein the voltage converting unit (8) converts the first voltage (VBat) into a voltage with a voltage value equal or higher than the third voltage value.

23. The emergency power supply unit (A) according to claim 16, wherein the control unit (5) is configured to drive a second light.

24. The emergency power supply unit (A) according to claim 16, wherein the control unit (5) is configured to obtain automatic testing commands via a DALI-interface (7).

25. The emergency power supply unit (A) according to claim 16, wherein the energy storage unit (2) is a battery, wherein the battery is rechargeable with a main voltage supply (1).

26. The emergency power supply unit (A) according to claim 16, wherein the control unit (5) is configured to determine a main voltage supply loss and wherein after the determination of the main voltage supply loss the energy storage unit (2) is configured to provide the first voltage (VBat) with the first voltage value.

* * * * *